US005481235A

United States Patent [19]

Heise et al.

[11] Patent Number: 5,481,235

[45] Date of Patent: Jan. 2, 1996

[54] CONDUCTING SPRING FOR A CIRCUIT INTERRUPTER TEST CIRCUIT

[75] Inventors: James A. Heise; Duane L. Turner; Jeffrey M. Kaufman, all of Cedar Rapids, Iowa; Thomas C. Leach, Lexington, Ky.

[73] Assignee: Square D Company, Palatine, Ill.

[21] Appl. No.: 221,424

[22] Filed: Mar. 31, 1994

[51] Int. Cl.[6] .................................................. H01M 73/00

[52] U.S. Cl. ................................................ 335/18; 361/42

[58] Field of Search .......................... 335/18; 361/42–51

[56] References Cited

U.S. PATENT DOCUMENTS

| | | | |
|---|---|---|---|
| 4,595,894 | 6/1985 | Doyle et al. | 335/18 |
| 4,686,600 | 8/1987 | Morris et al. | 361/42 |
| 5,291,165 | 3/1994 | Whipple et al. | 335/18 |

*Primary Examiner*—Lincoln Donovan

*Attorney, Agent, or Firm*—Kareem M. Irfan; Larry I. Golden

[57] ABSTRACT

A conducting spring is provided for exerting a biasing force against a test button to open a circuit interrupter test circuit. The spring includes a one-piece, elongated cantilever having a first and second end. The cantilever is formed from an electrically conducting material. One of the cantilever ends is adapted to directly secure to a first terminal of the test circuit. The other cantilever end is adapted to directly and reversibly contact a second terminal of the test circuit. The spring also includes means for resiliently flexing the second end of the cantilever in relation to the first end. The flexing means is integrally formed with the cantilever. Also provided is a ground fault circuit interrupter and a ground fault circuit module for protecting a circuit interrupter with a push-to-test feature.

21 Claims, 3 Drawing Sheets

*Fig. 4*
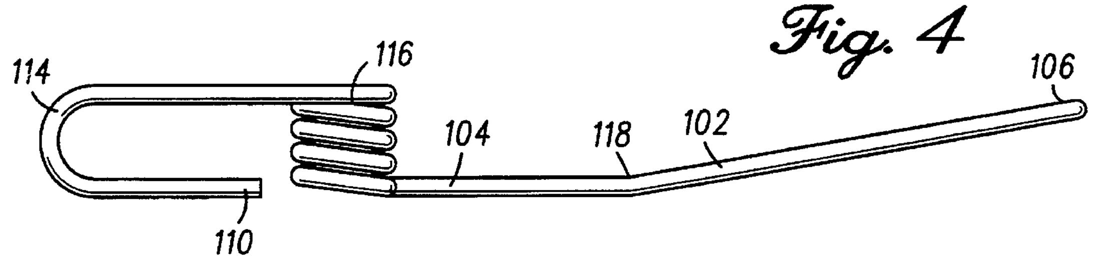
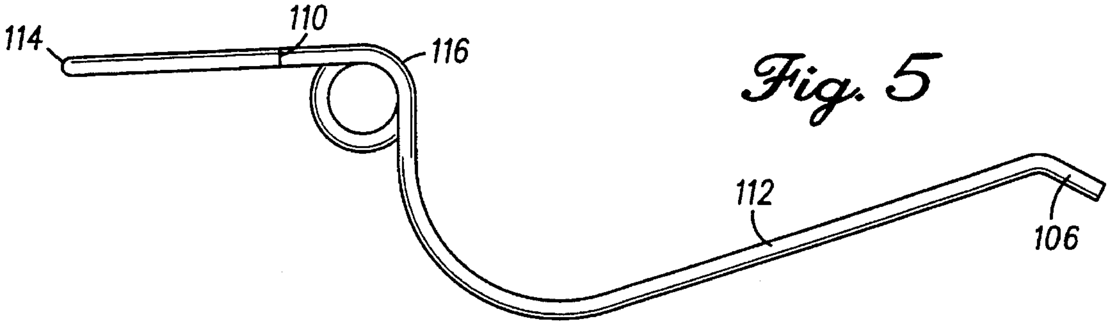
*Fig. 5*
*Fig. 6*
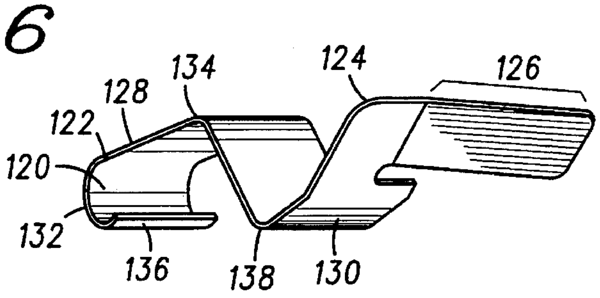
*Fig. 7*
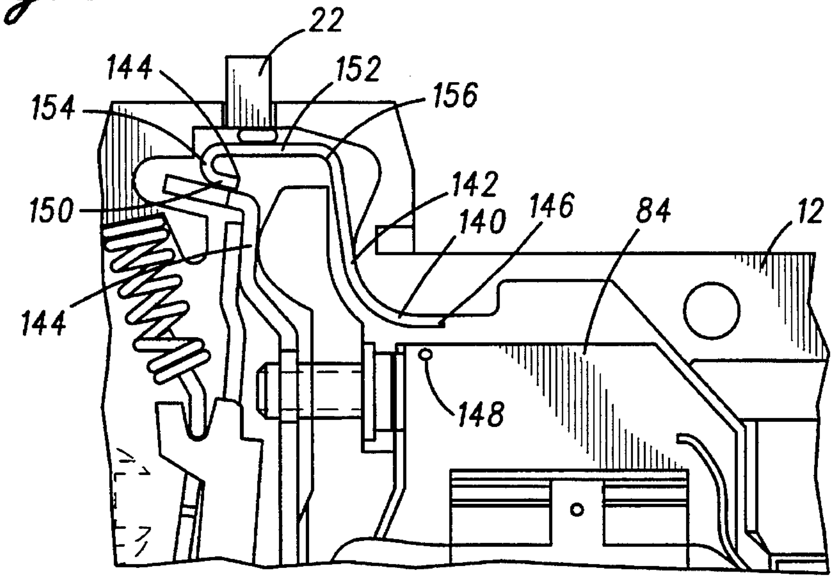

CONDUCTING SPRING FOR A CIRCUIT INTERRUPTER TEST CIRCUIT

FIELD OF THE INVENTION

The present invention relates to a conducting spring exerting a biasing force against a test button as it is deflected to reversibly close an electrical contact for a test circuit within circuit interrupters and the like.

BACKGROUND OF THE INVENTION

The electrical systems in residential, commercial and industrial applications usually include a panelboard for receiving electrical power from a utility source. The power is then routed through overcurrent protection devices to designated branch circuits supplying one or more loads. These overcurrent devices are typically circuit interrupters such as circuit breakers and fuses which are designed to interrupt the electrical current if the limits of the conductors supplying the loads are surpassed. Interruption of the circuit reduces the risk of injury or the potential of property damage from a resulting fire.

Circuit breakers are a preferred type of circuit interrupter because a resetting mechanism allows their reuse. Typically, circuit breakers interrupt an electric circuit due to a trip condition such as a current overload or ground fault. The current overload condition results when a current exceeds the continuous rating of the breaker for a time interval determined by the trip current. The ground fault trip condition is created by an imbalance of currents flowing between a line conductor and a neutral conductor such as a grounded conductor, a person causing a current path to ground, or an arcing fault to ground.

An example of a ground fault interrupter is a fast acting circuit breaker that disconnects equipment from the power line when some current returns to the source through a ground path. Under normal circumstances all current is supplied and returned within the power conductors. But if a fault occurs and leaks some current to ground, then the ground-fault circuit interrupter (GFCI) will sense the difference in current in the power conductors. If the fault level exceeds the trip level of the GFCI, then the circuit will be disconnected. The trip level for protection of personnel is usually in the range of about 4 mA to 6 mA. The trip level for the protection of equipment is usually about 30 mA.

GFCIs commonly have a push-to-test feature which provides a test circuit located inside the circuit interrupter housing and a externally accessible push-button mounted through the housing. Pushing the button closes the test circuit which simulates a ground fault to check the operation of the circuit interrupter.

The prior art as exemplified in U.S. Pat. No. 4,081,852 issued to Coley et al. and U.S. Pat. No. 4,568,899 issued to May et al. disclose a manual button which closes a test circuit between two wires. The wires lead to the trip circuit and a neutral conductor or to other components such as a circuit board. The wires cause several problems. Routing of the wires during assembly of the circuit breaker requires a disproportionate amount of time and expense and complicates automation of the assembly process. Placement of the wires in close proximity to one another can also lead to arcing during high voltage surges. Any damage to the wiring insulation can lead to a dielectric breakdown and a short condition.

The need arises to overcome the problems associated with using wire leads for connecting a test circuit in GFCIs. The present invention provides a conducting spring which reversibly completes the current path for the test circuit. The conducting spring is inexpensively manufactured and assembly and effectively prevents arcing with other components of the circuit interrupter.

SUMMARY OF THE INVENTION

In accordance with the present invention, a conducting spring is provided for exerting a biasing force against a test button to open a circuit interrupter test circuit. The spring includes a one-piece, elongated cantilever having a first and second end. The cantilever is formed from an electrically conducting material. One of the cantilever ends is adapted to directly secure to a first terminal of the test circuit. The other cantilever end is adapted to directly and reversibly contact a second terminal of the test circuit. The spring also includes means for resiliently flexing the second end of the cantilever in relation to the first end. The flexing means is integrally formed with the cantilever. The cantilever has a first arm extending from the first end to the flexing means and a second arm extending from the second end to the flexing means. The second arm is adapted to abut a test button and exert a biased force against the test button.

The present invention also provides a ground fault circuit interrupter for protecting a circuit which includes an electrically insulating housing and a test button slidably mounted through the housing. The button is externally accessible. The interrupter further includes an electronic signal processor for determining ground fault conditions within a protected circuit and for providing an output signal to operate a pair of contacts to interrupt current flow through the circuit. A first test circuit terminal connects to the electronic signal processor for testing the operation of the circuit interrupter by simulating a ground fault when energized. A second test circuit terminal provides current for energizing the first terminal. A spring is positioned within the housing. The spring is mechanically supported and electrically connected to one of the test terminals and aligned to reversibly contact the other test terminal. The spring is of the type substantially described above.

The present invention also provides a ground fault circuit module for protecting a circuit interrupter with a push-to-test feature. The circuit includes a circuit board and means for sensing a current imbalance between a line and neutral. An electronic signal processor connects to the sensing means for determining ground fault conditions within a protected circuit and for providing an output signal adapted to operate a pair of contacts to interrupt current flow through the circuit. The sensing means and processor are mounted on the circuit board. A test circuit input connects to the electronic signal processor for testing the operation of the circuit interrupter by simulating a ground fault when energized. The test input is mounted on the circuit board. A spring is mechanically supported and electrically connected to the test input and aligned to reversibly contact the means for energizing the test input. The spring is of the type described above.

Accordingly, an object of the invention is to provide a conducting spring which exerts a biasing force against a test button to open a circuit interrupter test circuit.

Another object of the invention is to provide a conducting spring which eliminates wire connections through direct mechanical and electrical connection with the circuit interrupter test circuit.

A further object of the invention is to provide a GFCI which has fewer component parts and allows for automated assembly.

Yet another object of the present invention is to provide a conducting spring which prevents high voltage surge arcing between components of the test circuit and GFCI.

Other and further advantages, embodiments, variations and the like will be apparent to those skilled in the art from the present specification taken with the accompanying drawings and appended claims.

BRIEF DESCRIPTION OF THE DRAWINGS

In the drawings, which comprise a portion of this disclosure:

FIG. 4 is an isolated top plan view of the conducting spring 4 illustrated in FIG. 3;

FIG. 5 an isolated side view of the conducting spring illustrated in FIG. 3;

FIG. 6 is an isolated perspective view of a second embodiment of the inventive conducting spring; and FIG. 7 is a fragmentary cross-sectional view of the circuit breaker in FIG. 3 illustrating a third embodiment of the inventive conducting spring.

DETAILED DESCRIPTION

Figure 1:
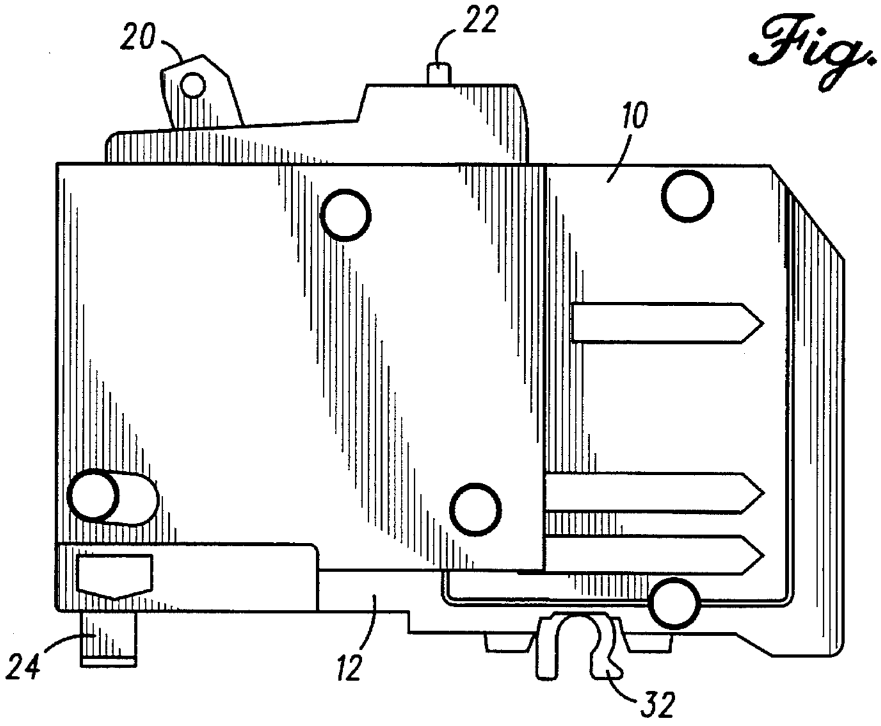
FIG. 1 is a side view of an embodiment of the present invention illustrating a circuit interrupter.
Figure 2:
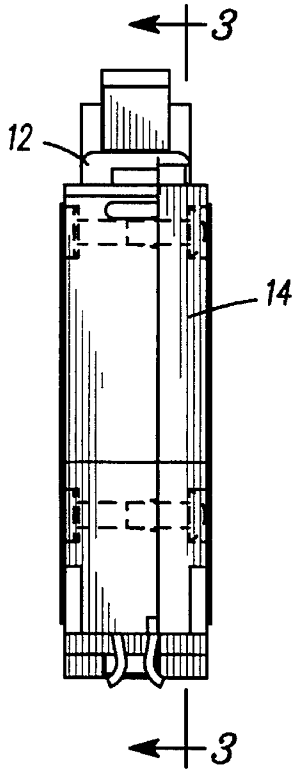
FIG. 2 is an end view of the circuit interrupter illustrated in FIG. 1.
Figure 3:
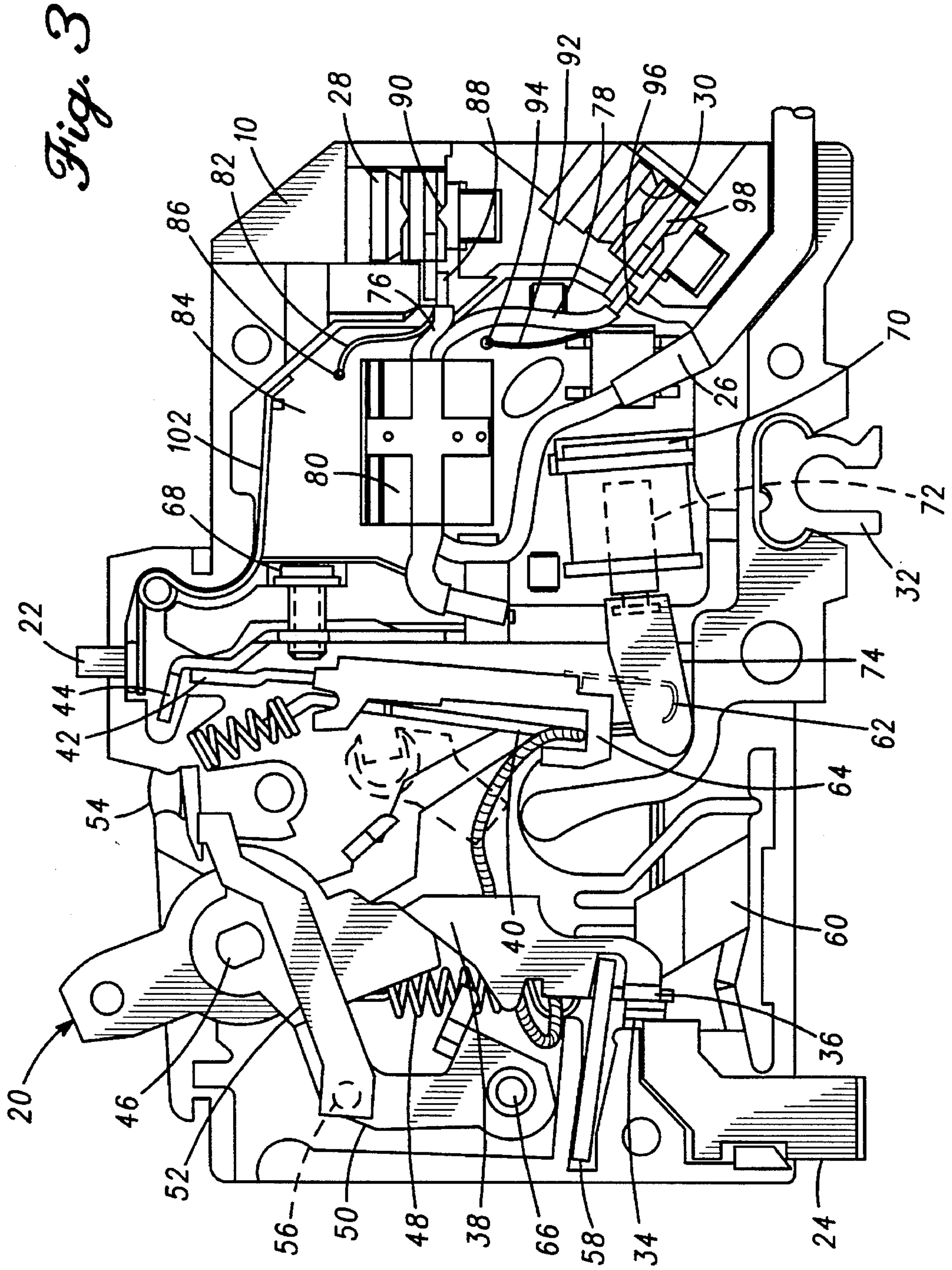
FIG. 3 is a cross-sectional view taken along lines 3—3 of FIG. 2 illustrating one embodiment of the conducting spring in an ground fault test circuit.

A preferred embodiment of the present invention is depicted in the form of a ground fault circuit interrupter (GFCI) 10 in FIGS. 1, 2 and 3. The GFCI 10 includes an electrically insulating housing 12 closed at one face by a detachable cover 14 which together enclose the components of the operating mechanism and a ground fault circuit module, generally designated as 16 and 18 respectively. An operating handle 20 and test button 22 are mounted through separate openings in the housing 12 for external manual operation. Similarly, electrical connections are made to a jaw-like line terminal 24 and a line neutral terminal wire 26 which extend through the housing 12. Mounted through the surface of the housing 12 are a load terminal 28 and a load neutral terminal 30 which are externally accessible. A clip 32 secured to the housing mounts the circuit interrupter 10 to a panelboard (not shown) or the like.

Referring specifically to FIG. 3, the circuit path between a source and load (not shown) starts with the line terminal 24 carrying current through a stationary contact 34 which is aligned to reversibly engage a movable contact 36. The movable contact 36 may be formed as part of a carrier 38 which carries the current through a flexible conductor 40 to a bimetal conductor 42. A rigid conductive terminal 44 is welded to the bimetal conductor 42 and carries the current to the load terminal 28 as will be discussed in more detail below.

Manual control of the operating mechanism 16 is provided using the operating handle 20 pivotally mounted about an axis 46 in the housing 10 to control the carrier 38. The upper end of the carrier 38 is rotatably secured to the bottom of the operating handle 20 so that the carrier 38 can be rocked clockwise and counterclockwise using a toggle spring 48. The toggle spring 48 is secured to the bottom of the carrier 38 and to an equilibrium position on a trip lever 50 so as to urge the carrier 38 toward the operating handle 20.

In response to movement of the handle 20 to the right or left, the carrier 38 is moved counterclockwise or clockwise, respectively, by the action of the toggle spring 48. The operating handle 20 moves the top of the carrier 38 to either side of the equilibrium position, so that the bottom of the carrier 38 biases the movable contact 36 to either the open or closed position.

A flag armature 52 which is externally visible through a lens 54 indicates the position of the movable contact 36 by connecting to the trip lever 50 at a reset pin 56. The components of the operating mechanism 16 are shielded by a slide 58 and an arc chute 60 from any arcing caused during the opening and closing the contacts 34 and 36.

The operating mechanism 16 is also controlled by the trip lever 50. Upon the occurrence of a moderately sustained overload condition when the contacts 34 and 36 are in a closed position, the temperature of the bimetal conductor 42 increases and flexes to the right. In response to the flexing action, an armature 62 and a yoke 64 swing counterclockwise so as to release the stand-off pressure of the end of the trip lever 50. The trip lever 50 rotates clockwise about pin 66 causing the toggle spring 48 to pull the carrier 38 away from the stationary contact 34 so as to interrupt the current path.

Similarly, upon the occurrence of an extensive current overload condition, the yoke 64 manifests a magnetic force that attracts the armature 62 causing it to rotate counterclockwise. Consequently, the trip lever 50 responds by rotating clockwise and the toggle spring 48 pulls the carrier 38 away from the stationary contact 34 to disrupt the current path.

After being tripped, the trip lever 50 is reset by rotating the operating handle clockwise so that the bottom of the operating handle 20 pushes reset pin 56. The force acting on the reset pin 56 rotates the trip lever 50 counterclockwise to allow the end of the trip lever 50 to engage and set the armature 62.

The response of the tripping lever 50 to the appropriate tripping condition is set by a calibration screw 68. The calibration screw 68 engages the conductive terminal 44 causing it to rotate right or left to consequently change the position of the bimetal conductor 42, armature 62 and yoke 64. The calibration screw 68 is externally accessible.

The above-described current path and components are similar in structure and operation to the corresponding components in U.S. PAT. No. 4,623,859, entitled "Remote Control Circuit Breaker," issued Nov. 18, 1986, and assigned to the instant assignee. The entire disclosure of this patent is hereby incorporated by reference.

The operating mechanism 16 is also controlled by the ground fault circuit module 18. In response to a signal from the ground fault circuit module 18, a solenoid 70 drives a plunger 72 and an associated trip link 74 to engage the armature 62. As previously described, rotating the armature 62 consequently causes the trip lever 50 to disrupt the current path.

The ground fault circuit module 18 measures an imbalance in the current flow through a load lead 76 and a neutral load lead 78 using a coil assembly 80. The load lead 76 connects at one end to the conductor terminal 44, extends through the coil assembly 80, and connects to the load terminal 28 at the opposite end. A load board lead 82 delivers power to the circuit board 84 through a crimp connector 86 therethrough. The opposite end of the load board lead 82 is crimped with the end of the load lead 76 in a two-to-one wire harness 88. The wire harness 88 is welded to the underside of a conventional clamp plate 90 which connects to load terminal 28.

Similarly, the neutral load lead 78 connects at one end to the line neutral terminal 26, extends through the coil assembly 80, and connects to the load neutral terminal 30 at the opposite end. A ground board lead 92 provides a ground to the circuit board 84 through a crimp connector 94 therethrough. The opposite end of the ground board lead 92 is crimped with the end of the neutral load lead 78 in a two-to-one wire harness 96. The wire harness 96 is welded to the underside of a conventional clamp plate 98 which connects to the load neutral terminal 30.

The crimp connectors 86 and 94 advantageously provide wire strain relief. Welding the wire harnesses 88 and 96 to the clamp plates 90 and 98, respectively, provides relief from wire strain and fraying. This assembly method also reduces the number of manual operations and improves the quality of the assembled product. Preferably, the board leads 82 and 92 are size 22 gauge wire and the leads 76 and 78 are size 16 gauge wire.

The coil assembly 80 outputs a signal to a conventional electronic signal processor mounted on a printed circuit board 84. A suitable coil assembly 80 is a transformer or other means for sensing a current imbalance between line and neutral leads. The coil assembly 80 is fully described in copending U.S. patent application Ser. No. 08/182,920 which application is incorporated by reference. Also connected to the circuit board 84 is the solenoid 70. The discrete electrical components are omitted from the circuit board 84 for the purposes of clarity.

The present invention provides a circuit for testing the operation of the ground fault circuit module 18. The test circuit simulates a ground fault by completing the current path from the conductor terminal 44 to the electronic signal processor on the circuit board 84. A spring 102 is disposed between the conductor terminal 44 and the circuit board 84. An embodiment of the spring 102 is more particularly illustrated in FIGS. 4 and 5. The spring 102 includes an elongated cantilever 104. The term cantilever is defined by a projecting beam or member supported at one end.

A first end 106 of the cantilever is mechanically supported and electrically connected to a post 108 which extends perpendicularly from the surface of the circuit board 84. Preferably, a suitable fastening means like spot welding is used. Mechanical fasteners like screws and rivets are avoided. The support provided by mechanically securing the cantilever end 106 and post 108 also aligns and positions a second end 110 of the cantilever to make the electrical connection which completes the test circuit. The post 108 is electrically connected to the circuit tracings (not shown) on the circuit board 84.

The cantilever 104 includes a first arm 112 located near the first cantilever end 106 and a second arm 114 located near the second end 110 of the cantilever. The length of the first arm 112 is preferably shaped to conform to the interior configuration of the housing 10 and provide an electrical connection directly with the test circuit on the circuit board 84.

The second arm 114 abuts the bottom of the test button 22 and also provides an electrical contact area for reversibly engaging the conductor terminal 44. Preferably, the second arm 114 is curled back on itself to provides a larger contact area for the test button 22 and the conductor terminal 44. The second arm 114 is biased against the test button 22 by a coil

116 integrally formed with the cantilever 104 between the first and second ends 106, 110. The present invention contemplates other means for flexing the second cantilever end 110 in relation to the first end 106 to provide reversible electrical contact between the circuit board 84 and conductor terminal 44 as is exemplified and described below.

To operate the test circuit, the test button 22 is manually depressed to overcome the biasing force exerted by the coil 116 on the second arm 114 of the cantilever. The test button 22 continues to push on the top of the second arm 114 until the bottom of the second arm 114 abuts the conductor terminal 44. Once the second arm 114 engages the conductor terminal 44, the current path is completed to simulate a ground fault. When the operator stops depressing the test button 22, the coil 116 provides sufficient biasing force to return the test button to its original position. Consequently, the second arm 114 separates from the conductor terminal 44 and disrupts the current path.

The cross-section of the cantilever 104 has a wire-like shape. The diameter of the wire is preferably about 0.026 inches and the mean diameter of the coil 116 is about 0.130 inches. The coil 116 provides for about 10,000 cycles between about 65 and about 45 degrees. A break 118 is provided in the cantilever to position and align the second cantilever end 110 to follow the interior of the housing 10.

The spring 102 is made of an electrically conducting material. Preferably, type 302 stainless steel is used. Tempered, tin-plated, or galvanized steel are examples of other suitable materials. For repeated use, the spring should be capable of recovering its shape after deformation. Preferably, the material from which the spring 82 is made is also resilient.

Other embodiments of the spring are contemplated by the present invention. These embodiments are for illustrative purposes only and are not intended to be limiting.

One such spring embodiment 120 is illustrated in FIG. 6. The spring 120 includes an elongated cantilever 122 having a first end 124 mechanically supported and electrically connected to the surface of the circuit board. This embodiment 120 of the spring illustrates an alternate means of connection to the circuit board. The first end 124 has a elongated terminal pad 106 for contact with a conductive edge plated solder pad on the circuit board. Preferably, a suitable fastening means like soldering is used. The terminal pad 126 can also be held in contact with the circuit board solder pad wedging the terminal pad 126 between the circuit board and the interior of the housing.

The cantilever 122 includes a first arm 128 located near the first cantilever end 124 and a second arm 130 located near a second end 132 of the cantilever. The length of the first arm 128 is preferably shaped to conform to the interior configuration of the housing and provide an electrical connection directly with the test circuit on the circuit board.

The second arm 130 abuts the bottom of the test button and also provides an electrical contact area for reversibly engaging the conductor terminal. Preferably, the second arm 130 is curled underneath itself to provide a larger contact area 136 at the same angle as the conductor terminal. The second arm 130 is biased against the test button by an angular bend 134 integrally formed with the cantilever 122 between the first and second ends 124, 132. The angular bend 134 exemplifies another flexing means contemplated by the present invention.

The cross-section of the cantilever 122 has a flattened, sheet-like shape. A break 138 is provided in the cantilever to position and align the second cantilever end 132 to contact the conductor terminal.

The spring 130 is made of an electrically conducting and resilient material. For repeated use, the spring should be capable of flexing at the angular bend 134 without cracking or deformation.

Another spring embodiment 140 is illustrated in FIG. 7. The spring 140 includes an elongated cantilever 142 having a first end 144 mechanically supported and electrically connected to the surface of the conductor terminal 44. This embodiment 140 of the spring illustrates an alternate site of connection other than the circuit board 80. Preferably, a suitable fastening means like spot welding is used. Mechanical fasteners like screws and rivets are avoided. The support provided by mechanically securing the first cantilever end 144 and conductor terminal 44 also aligns and positions a second end 146 of the cantilever to make the electrical connection which completes the test circuit. The second cantilever end 146 makes an electrical connection on the circuit board 84 with a post 148. The post 148 is electrically connected to the circuit tracings (not shown) on the circuit board 84. Alternately, a conductive edge plated solder pad connected to the circuit board tracings can be used as the electrical terminal on the circuit board 84 for contacting the second cantilever end 146.

The cantilever 142 includes a first arm 150 located near the first cantilever end 144 and a second arm 152 located near the second end 146 of the cantilever. The length of the first arm 150 is preferably shaped to conform to the configuration of the top of the conductor terminal 44 and provide an electrical connection directly with this terminal of the test circuit.

The second arm 152 abuts the bottom of the test button 22 and also provides an electrical contact area for reversibly engaging the rigid conductor 44. Preferably, the second arm 152 provide a flattened contact area at the second end 152 for contacting the post 148. The length of the second arm 152 has the shape of an arch 154 made with a uniform angle across a portion of the second arm 152. The arch 154 is integrally formed with the cantilever 142 between the first and second ends 144, 146 and biases the top of the second arm 152 against the bottom of the test button 22. The arch 154 exemplifies another flexing means contemplated by the present invention.

The cross-section of the cantilever 142 has a flattened, sheet-like shape. A break 156 is provided in the cantilever to position and align the second cantilever end 146 to contact the circuit board 84.

The spring 140 is made of an electrically conducting and resilient material. For repeated use, the spring should be capable of flexing along the arch 154 without cracking or deformation.

As illustrated, the one-piece inventive spring provides a direct electrical connection between two terminals of a circuit interrupter test circuit. One of the unique features is to mechanically support the inventive spring directly on a terminal of the test circuit such as the circuit board or the rigid conductor. The use of wire leads or connectors is eliminated. Assembly of the circuit interrupter is made easier and inventory costs are lowered with fewer parts needed.

The present invention is not limited to the use of a coil to provide torsional flexing for the inventive spring and the biasing force to reversibly close the terminals of the test circuit. An angular bend in the body of the spring is also suitable. Another example of the flexing means is an arch in a portion of the spring with a uniform or non-uniform radius.

The inventive spring was tested to prevent conductance during high voltage surges. This impulse dielectric test assures that there is ample clearance between the spring and the terminal of the test circuit to prevent arcing. The present invention withstood at least a 7 kV pulse test without an arcing failure.

As those skilled in the art will appreciate, the inventive spring can be adapted and configured for use with a wide variety of circuit breakers and other circuit interrupters. The inventive spring is suitable for use in low, medium, and high voltage applications and in various phase configurations. The term circuit interrupter is defined to include but not be limited to, single or polyphase circuit breakers, vacuum or air circuit breakers, fusible switches, switchgear, and the like.

The conducting spring methodology and apparatus described above can be advantageously used for test circuits in all types of GFCIs and ground fault equipment. Three types of GFCI are commonly available. The first or separately enclosed type is available for 120-volt 2-wire and 120/240-volt 3-wire circuits up to 30 amp. The second type combines a 15-, 20-, 25-, or 30-amp circuit breaker and a GFCI in the same plastic case. It is installed in place of an ordinary breaker in a panelboard and is usually available in 120-volt 2-wire, or 120/240-volt 3-wire types which may also be used to protect a 2-wire 240-volt circuit. The second type provides protection against ground faults and overloads for all outlets on the circuit. A third type having a receptacle and a GFCI in the same housing provides only ground-fault protection to the equipment plugged into that receptacle. There are feed-through types of GFCI which provide protection to equipment plugged into other ordinary receptacles installed downstream on the same circuit.

Examples of ground fault equipment are commercially available from the Square D Company under the catalog designations GROUND-CENSOR™, HOMELINE®, QO®, TRILLIANT® and MICROLOGIC® ground fault modules. This ground fault equipment is suitable for protection of main, feeder, and motor circuits on electrical distribution systems. It is also useable as ground fault relay and ground fault sensing devices.

While particular embodiments and applications of the present invention have been illustrated and described, it is to be understood that the invention is not limited to the precise construction and compositions disclosed herein and that various modifications, changes, and variations which will be apparent to those skilled in the art may be made in the arrangement, operation, and details of construction of the invention disclosed herein without departing from the spirit and scope of the invention as defined in the appended claims.

What is claimed is:

1. A spring exerting a biasing force against a test button to open a circuit interrupter test circuit, the spring comprising:

a one-piece, elongated cantilever having a first and second end, the cantilever being formed from an electrically conducting material, one of the cantilever ends being adapted to directly secure to a first terminal of the test circuit, the other cantilever end being adapted to directly and reversibly contact a second terminal of the test circuit;

means for resiliently flexing the second end of the cantilever in relation to the first end, the flexing means being integrally formed with the cantilever; and the cantilever having a first arm extending from the first end to the flexing means and a second arm extending from the second end to the flexing means, the second arm being adapted to abut a test button and exert a biased force against the test button.

2. The spring of claim 1 wherein the flexing means is a coil integrally formed with the cantilever, the cantilever having a wire-like shape.

3. The spring of claim 2 wherein the length of the first cantilever arm is shaped to substantially conform to the configuration of the circuit interrupter housing interior.

4. The spring of claim 2 wherein the shape of the second cantilever arm is curled upon itself to provide a large contact area being adapted to abut the test button and electrically contact the second terminal.

5. The spring of claim 1 wherein the length of the first cantilever arm having the shape of an arch made with a uniform angle across the length of the first cantilever arm, the flexing means includes the cantilever being formed from a resilient material at least along the arch.

6. The spring of claim 1 wherein the flexing means includes at least one angular bend positioned between generally straight segments across the length of the cantilever, the cross-section of the cantilever having a flattened, sheet-like shape.

7. A ground fault circuit interrupter for protecting a circuit, the interrupter comprising:

an electrically insulating housing;

a test button slidably mounts through the housing, the button being externally accessible;

an electronic signal processor determines ground fault conditions within a protected circuit and provides an output signal to operate a pair of contacts to interrupt current flow through the circuit;

a first test circuit terminal connects to the electronic signal processor for testing the operation of the circuit interrupter by simulating a ground fault when energized;

a second test circuit terminal provides current for energizing the first terminal;

a spring being positioned within the housing, the spring being mechanically supported and electrically connected to one of the test terminals and aligned to reversibly contact the other test terminal;

the spring including a one-piece, elongated cantilever having a first and second end, the cantilever being formed from an electrically conducting material, one of the cantilever ends directly secures to the first test terminal, the other cantilever end directly and reversibly contacts the second test terminal;

means for resiliently flexing the second end of the cantilever in relation to the first end, the flexing means being integrally formed with the cantilever; and the cantilever having a first arm extending from the first end to the flexing means and a second arm extending from the second end to the flexing means, the second arm abuts the test button with a biased force.

8. The interrupter of claim 7 wherein the first test terminal is a conductive post electrically connected to the electronic signal processor mounted on a circuit board and the second test terminal is a rigid conductor.

9. The interrupter of claim 8 wherein the first cantilever end is mechanically secured to the post so that the second cantilever end is aligned to abut the test button with a biased force and reversibly contact the rigid conductor.

10. The interrupter of claim 8 wherein the first cantilever end is mechanically secured to the top of the rigid conductor so that the second cantilever end is aligned to abut the test button with a biased force and reversibly contact the post.

11. The interrupter of claim 7 wherein the first test terminal is a conductive edge plated solder pad electrically connected to the electronic signal processor mounted on a circuit board, the Second test terminal is a rigid conductor, the first cantilever end is mechanically secured to the solder pad so that the second cantilever end is aligned to abut the test button with a biased force and reversibly contact the rigid conductor.

12. The interrupter of claim 7 wherein the flexing means is a coil integrally formed with the cantilever, the cantilever having a wire-like shape.

13. The interrupter of claim 12 wherein the length of the first cantilever arm is shaped to substantially conform to the configuration of the housing interior and the shape of the second cantilever arm is curled upon itself to provide a large contact area being adapted to abut the test button and electrically contact the second terminal.

14. The interrupter of claim 7 wherein the length of the first cantilever arm having the shape of an arch made with a uniform angle across the length of the first cantilever arm, the flexing means includes the cantilever being formed from a resilient material at least along the arch.

15. The interrupter of claim 7 wherein the flexing means includes at least one angular bend positioned between generally straight segments across the length of the cantilever, the cross-section of the cantilever having a flattened, sheet-like shape.

16. A ground fault circuit module for protecting a circuit interrupter with a push-to-test feature, the module comprising:

a circuit board;

means for sensing a current imbalance between a line and neutral, the sensing means being mounted on the circuit board;

an electronic signal processor connects to the sensing means for determining ground fault conditions within a protected circuit and provides an output signal adapted to operate a pair of contacts to interrupt current flow through the circuit, the electronic signal processor being mounted on the circuit board;

a test circuit input connects to the electronic signal processor for testing the operation of the circuit interrupter by simulating a ground fault when energized, the test input being mounted on the circuit board; and a spring being mechanically supported and electrically connected to the test input and aligned to reversibly contact means for energizing the test input.

17. The circuit of claim 16 wherein the spring comprises:

a one-piece, elongated cantilever having a first and second end, the cantilever being formed from an electrically conducting material, the first cantilever end directly secures to the test input, the second cantilever end directly and reversibly contacts the energizing means;

means for resiliently flexing the second end of the cantilever in relation to the first end, the flexing means being integrally formed with the cantilever; and the cantilever having a first arm extending from the first end to the flexing means and a second arm extending from the second end to the flexing means, the second arm being adapted to abut a test button and exert a biased force against the test button.

18. The circuit of claim 17 wherein the flexing means is a coil integrally formed with the cantilever, the cantilever having a wire-like shape.

19. The circuit of claim 16 wherein the test input is a conductive post electrically connected to the electronic signal processor mounted on a circuit board.

20. The circuit of claim 16 wherein the test input is a conductive edge plated solder pad electrically connected to the electronic signal processor mounted on a circuit board.

21. The circuit of claim 16 wherein the sensing means comprises a transformer connected to the electronic signal processor and the module further comprises:

a load lead extending through the transformer and having one end crimped in a first two-to-one wire harness;

a neutral load lead extending through the transformer and having one end crimped in a second two-to-wire harness;

a load board lead connecting one end to the circuit board with a first crimp connector so that power is supplied to the electronic signal processor, the opposite end being crimped to the first wire harness;

a ground board lead connecting one end to the circuit board with a second crimp connector so that a ground is provided for the electronic signal processor, the opposite end being crimped to the second wire harness; and the first wire harness is welded to a first clamp plate, the second wire harness is welded to a second clamp plate, the first and second clamp plates are adapted to connect to a load and a load neutral terminal, respectively.

* * * * *